(12) United States Patent
Lisec

(10) Patent No.: US 7,000,433 B1
(45) Date of Patent: Feb. 21, 2006

(54) DEVICE FOR HEATING PLATES OF GLASS

(75) Inventor: Peter Lisec, Amstetten-Hausmening (AT)

(73) Assignee: Technopat AG, St. Gallen (CH)

(\*) Notice: Subject to any disclaimer, the term of this patent is extended or adjusted under 35 U.S.C. 154(b) by 0 days.

(21) Appl. No.: 09/979,099

(22) PCT Filed: May 17, 2000

(86) PCT No.: PCT/AT00/00135

§ 371 (c)(1),
(2), (4) Date: Apr. 1, 2002

(87) PCT Pub. No.: WO00/69781

PCT Pub. Date: Nov. 23, 2000

(30) Foreign Application Priority Data

May 17, 1999 (AT) .................................... 872/99
Jun. 25, 1999 (AT) .................................... 1120/99

(51) Int. Cl.
C03B 27/052 (2006.01)
C03B 25/12 (2006.01)
F27B 9/24 (2006.01)

(52) U.S. Cl. ............... 65/356; 65/374.13; 65/273; 219/388; 219/395; 219/400; 219/405; 392/417; 392/437; 392/439; 432/121

(58) Field of Classification Search ............... 65/29.18, 65/102–107, 114–119, 182.2, 273, 348–351, 65/355, 356, 370.1, 374.13, DIG. 4; 219/388, 219/395–398, 400, 405, 443.1, 540, 553; 392/367, 417, 418, 435, 437, 439; 432/143–150, 432/8, 121, 122

See application file for complete search history.

(56) References Cited

U.S. PATENT DOCUMENTS

| 2,057,569 | A | * | 10/1936 | Goodwillie ................. 269/46 |
| 2,262,545 | A | | 11/1941 | Chan |
| 2,841,925 | A | * | 7/1958 | McMaster .................... 65/350 |
| 2,875,994 | A | * | 3/1959 | Mann ......................... 432/74 |
| 3,262,688 | A | * | 7/1966 | Beggs ....................... 266/113 |
| 3,293,020 | A | * | 12/1966 | Sleighter .................... 65/111 |
| 3,326,654 | A | * | 6/1967 | Plumat ....................... 65/111 |
| 3,637,362 | A | | 1/1972 | Oelke et al |
| 3,809,542 | A | * | 5/1974 | Lythgoe et al. ............. 65/33.2 |
| 3,844,757 | A | * | 10/1974 | Kaufman et al. ............ 65/114 |
| 3,942,967 | A | * | 3/1976 | Jack et al. .................. 65/114 |

(Continued)

FOREIGN PATENT DOCUMENTS

AT         399 335 B     4/1995

(Continued)

*Primary Examiner*—Eric Hug
(74) *Attorney, Agent, or Firm*—Young & Thompson

(57) ABSTRACT

A device for heating plates of glass (3) which are hardened or deformed, includes two ceramic heating plates (1) between which a plate of glass (3) is arranged. Compensation plates (20) are associated with the heating plates (1) at a distance therefrom, in addition to heaters (6) which are arranged close thereto. The heaters (6) are accommodated in housings (11) which are defined on one side of the heating plates (1). Holes (8) are provided in the heating plates (1). Gas is fed through the holes into the housing between the heating plates (1) and the compensating plates (2). The gas is heated by flowing past the compensating plates (20) and forms gas cushions (7) on both sides of the plate of glass (3) which hold the plate. The plate of glass (3) is heated in a homogenous manner by radiation and convection.

28 Claims, 2 Drawing Sheets

U.S. PATENT DOCUMENTS

| | | |
|---|---|---|
| 4,059,426 A | 11/1977 | Starr |
| 4,200,446 A | 4/1980 | Koontz |
| 4,336,442 A | 6/1982 | Starr |
| 4,373,702 A * | 2/1983 | Jayaraman et al. .......... 266/111 |
| 4,853,019 A * | 8/1989 | Blank et al. .................. 65/106 |
| 5,085,680 A * | 2/1992 | Bender et al. ................ 65/118 |
| 5,125,948 A * | 6/1992 | Vanaschen et al. ........... 65/348 |
| 5,236,488 A * | 8/1993 | Vehmas ....................... 65/114 |
| 6,007,873 A * | 12/1999 | Holcombe et al. ....... 427/376.2 |
| 6,053,011 A * | 4/2000 | Lisec ........................ 65/104 |

FOREIGN PATENT DOCUMENTS

| | | |
|---|---|---|
| BE | 561134 | 5/1960 |
| DE | 1 471 820 | 11/1968 |
| FR | 1.407.725 | 11/1965 |
| FR | 2 230 596 | 12/1974 |
| WO | 97/34844 | 9/1997 |
| WO | WO 97/34844 * | 9/1997 |

* cited by examiner

DEVICE FOR HEATING PLATES OF GLASS

The invention relates to a device for heating of glass plates, for example in the course of hardening of glass plates or heating of glass plates when they are to be bent.

Glass plates are tempered by their being heated to a temperature exceeding the tempering temperature of roughly 600° to 800° C. and then being quenched to a temperature below the critical temperature, for example, below 300° C. so that tempering stresses arise in the glass.

A device for tempering of glass plates in which glass plates are preheated, heated and then tempered by quenching is known from WO 97/34844 A.

The object of the invention is to make available a device of the initially mentioned type which can be used as a preheating zone or especially as a heating zone in glass tempering and/or bending systems.

This object is achieved as claimed in the invention with a device which has the features of the independent claim.

Preferred and advantageous embodiments of the device as claimed in the invention are the subject matter of the dependent claims.

Due to the execution of the device for heating glass plates as claimed in the invention there is uniform heating of the glass plates, the advantage being achieved especially by at least one of the heating plates consisting of metallic and/or ceramic material so that especially at the start of heating of the glass plate local temperature differences are avoided.

U.S. Pat. No. 3,637,362 discloses supporting glass plates which are supported underneath on rollers on one side by a gas cushion, the special execution of the outlet openings for the gas which forms the gas cushion being emphasized.

The object of the invention is to make available a device of the initially mentioned type which can be used as a preheating zone or especially as a heating zone in glass tempering and/or bending systems.

This object is achieved as claimed in the invention with a device which has the features of the independent claim. Preferred and advantageous embodiments of the device as claimed in the invention are the subject matter of the dependent claims.

Due to the execution of the device for heating glass plates as claimed in the invention there is uniform heating of the glass plates, the advantage being achieved especially by at least one of the heating plates consisting of metallic and/or ceramic material so that especially at the start of heating of a glass plate local temperature differences are avoided.

In one embodiment of the invention there can be a compensation plate which can consist of a metallic and/or ceramic material between the heating means and the heating plate which is adjacent to the glass plate to be heated. When there is one such compensation plate, the heating plate is uniformly heated by the heating means assigned to it. In this way the glass plate is uniformly heated, especially by radiation and thermal stresses in the glass plate (due to its nonuniform heating) and consequently cracks in the glass plate are avoided.

When there are additionally holes in the heating plate of the device as claimed in the invention, through which the heated gas supplied from the back of the heating plate, especially air, flows onto the glass plate, the glass plate is heated up especially effectively, since heat is transferred to it not only by radiation (heating plate), but also by convection (gas).

In one preferred embodiment the device as claimed in the invention comprises two heating plates spaced apart from one another, between which the glass plates to be heated can be inserted.

When the heating plate or the heating plates are not horizontally aligned, on the lower end of the heating plate or of the space between the heating plates there can be a support and transport device for the glass plates to be heated.

The heating plate (or if there are two heating plates, each heating plate) can be aligned at an angle of 30 to 40° to the vertical. The oblique position of the heating plate can also be variable.

One preferred material for the heating plates as claimed in the invention is heat-resistant metal (for example, steel) or a ceramic material with high emission coefficient. One example of a material which can comprise the heating plate of the device as claimed in the invention is a material based on oxide ceramic, for example, based on silicate and/or aluminum oxide. Preferably the heating plate provided as claimed in the invention consists of a ceramic material which contains silicate and aluminum oxide.

Other details, advantages and features of the invention result from the following description of the embodiments of the invention which are schematically shown in the drawings in a vertical section.

Figure 1:
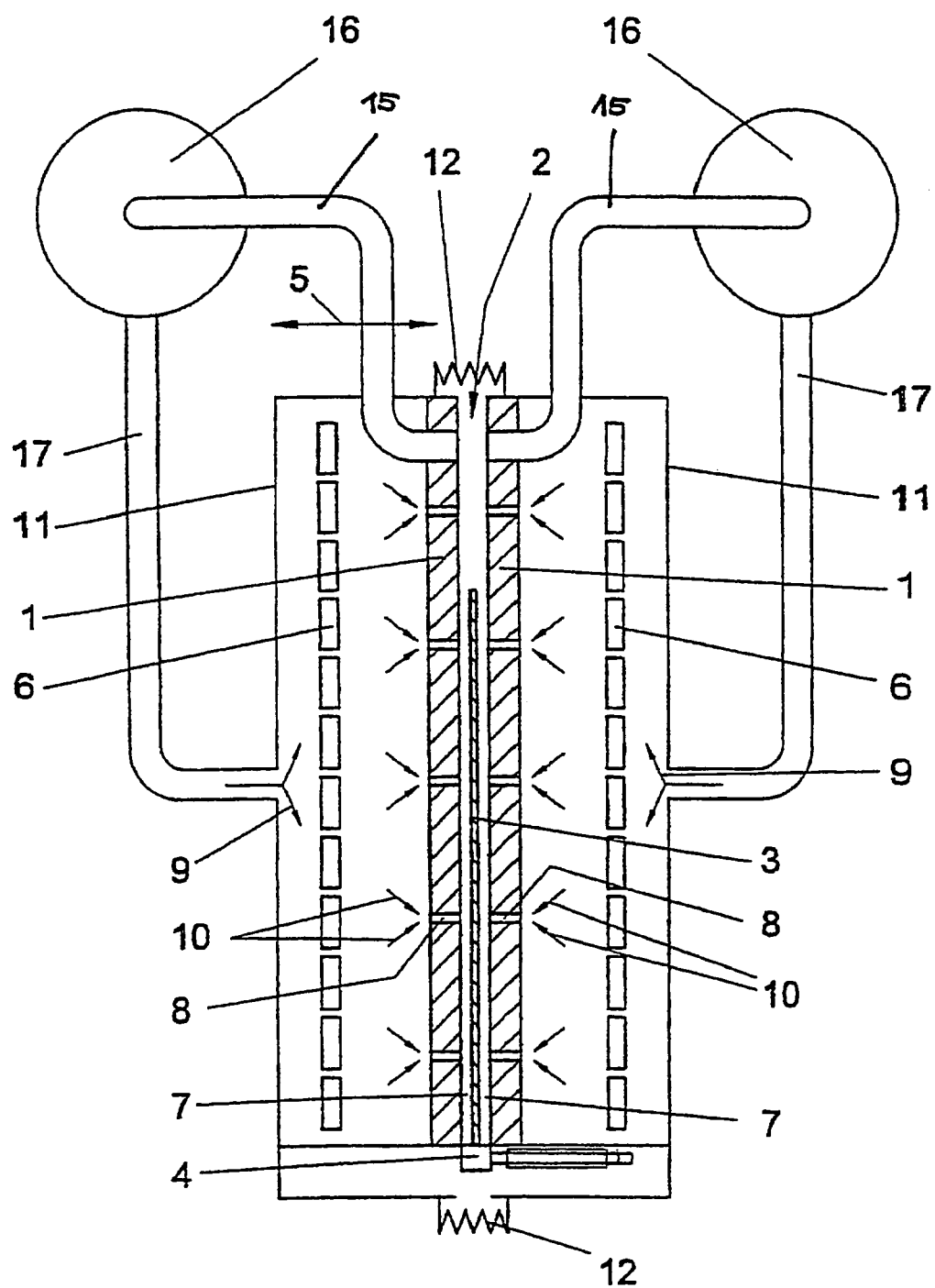
FIG. 1 shows a first embodiment.

In the embodiment shown in FIG. 1, the device as claimed in the invention comprises two heating plates 1 of metallic and/or ceramic material with a high coefficient for emission of heat radiation, aligned parallel to one another. The heating plates 1 in the embodiment shown are tilted a few degrees relative to vertical. But they can also be flatter, or horizontally aligned. Furthermore, there is the possibility of holding the heating plates 1 such that their tilt can be changed in order to be able to adapt the device to the respective circumstances.

A glass plate 3 to be preheated or heated is moved by a support and conveyor means 4 which is made in any form into the space 2 between the heating plates 1.

The distance of the heating plates 1 from one another is variable (arrow 5) so that the distance of the heating plates 1 from one another can be matched to the thickness of the glass plate 3 to be heated. Generally, the heating plates 1 will be located as near as possible to the glass plate 3 to be heated.

Heating means 6, for example gas-fired or electrical heating means 6 in the form of heating rods, heating plates or heating coils with which the heating plates 1 are heated, are assigned to the heating plates 1 on their side facing away from the space 2 in which a glass plate 3 is located. The heated heating plates 1 release heat, especially by radiation, to the glass plate 3 to be heated or preheated in order to preheat it or to heat it for example to a temperature above the tempering temperature or to the temperature at which it can be deformed (bent).

In addition and preferably, the device can be made such that on both sides of the glass plate 3 between the heating plates 1 a gas cushion 7 which supports the glass plate on both sides can be formed to reliably guide the glass plate 3 between the heating plates 1 and to prevent the glass plate 3 from touching one heating plate 1 or the other.

For this purpose, in the heating plates 1 there are holes 8 so that gas supplied from the back of the heating plates 1 (arrow 9) flows through the holes 8 into the space 2 (arrow 10) and on either side of the glass plates 3 gas cushions 7 form.

The advantage here is that the supplied gas which forms the gas cushions 7 between the glass plate 3 and the heating plates 1 (generally air) is heated by the heating means 6. Thus heat is transferred to the glass plate 3 to be heated not only by the heat radiation released by the heating plates 1, but also by convection.

It is preferable if the heating means 6 are accommodated in housings 11 provided on the backs of the heating plates 1; the housings are exposed to the gas which forms the gas cushions 7. Thus heat losses are for the most part prevented, since gas can flow only through the holes 8 in the heating plates 1 into the space 2.

In the preferred embodiment shown schematically by way of example in FIG. 1 the gas for the gas cushions 7 is supplied to the housings 11 such that it must flow through the heating means 6 before it reaches the holes 8 in the heating plates 1. Thus the gas is heated especially effectively.

Gas flowing out of the space 2 between the heating plates 1 can be routed in a circuit. For example, the discharging gas in the area of the upper end of the space 2 is withdrawn via lines 15 through the heating plates 1 and is supplied again to the housings 11 by a fan 16 or the like via lines 17.

To prevent losses of gas, the space 2 between the heating plates 1 is closed at the top and bottom by seals 12 of variable length, for example, elastic or folded seals. The somewhat vertical side edges of the space 2 can be closed by seals which can be folded away or pulled away for the delivery of a glass plate 3 to be heated and for the removal of a heated glass plate 3.

Advantageously the transport and support means 4 on the bottom edge of the heating plates 1 is encapsulated so that the transport and support means need not be gas-tight. For example, the transport and support means 4 can be accommodated in the embodiment shown in the drawings in a chamber on the lower edge of the housing 11.

Figure 2:
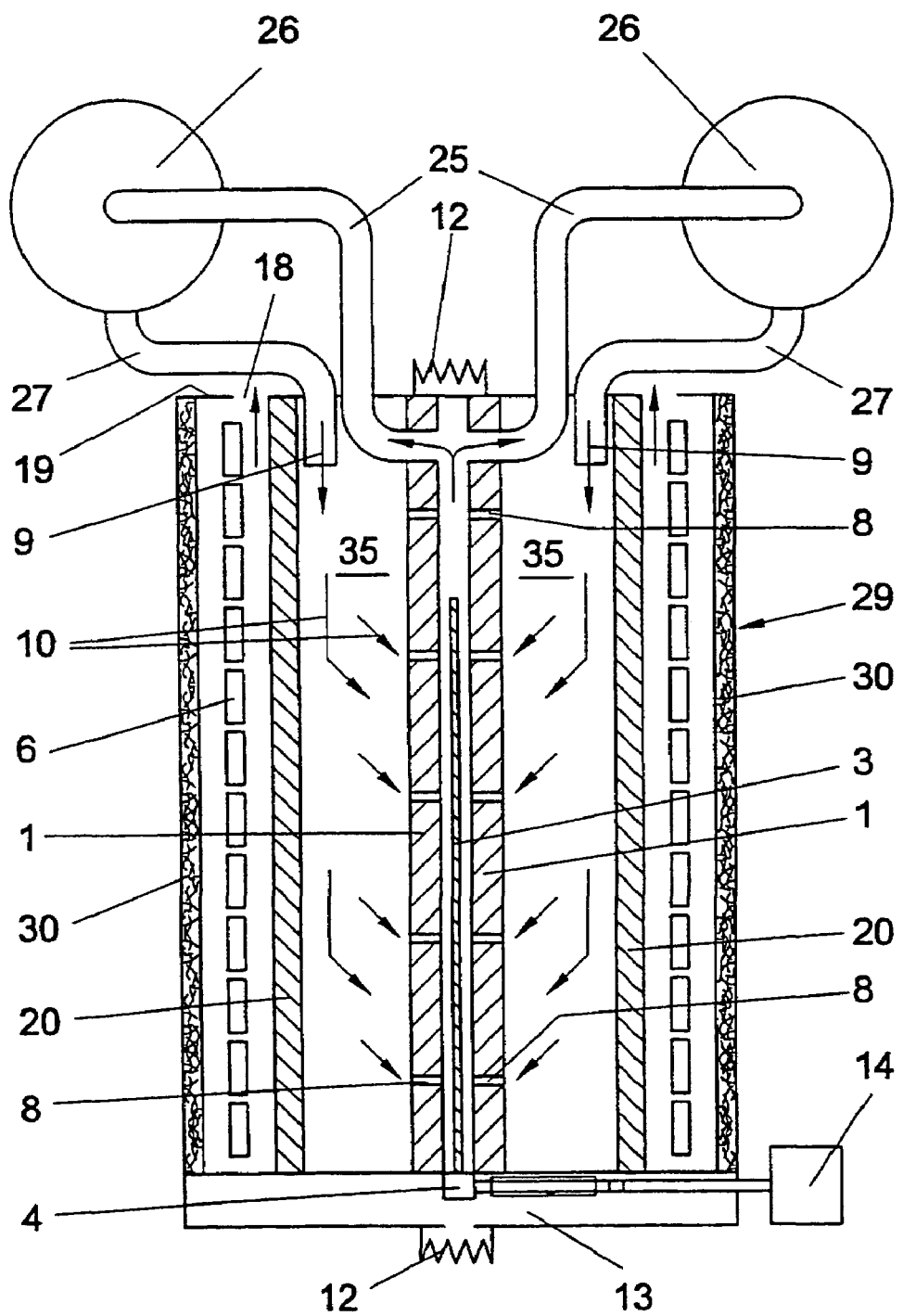
FIG. 2 shows a second embodiment.

The embodiment of a device as claimed in the invention as shown in FIG. 2 comprises two heating plates 1 of metallic and/or ceramic material with a high coefficient for emission of heat radiation, aligned parallel to one another. The heating plates 1 can be tilted 30 to 40° to the vertical. But they can also be flatter or steeper, or horizontally aligned. Furthermore, in the embodiment of FIG. 2 there is the possibility of being able to change the tilt of the heating plates 1 in order to be able to adapt the device to the respective circumstances.

Between the heating plates 1 and the heating means 6 in the embodiment of FIG. 2 there are compensation plates 20 which are parallel to the heating plates 1. The compensation plates 20 which can consist of the same material as the heating plates 1 are heated by the heating means 6 and release heat uniformly by radiation, i.e. largely without local temperature differences, to the heating plates 1. This, even if the heating means 6 do not uniformly heat the compensation plates 20, for example when heating rods, coils (or gas-fired) heat radiators are used as the heating means 6.

It is preferable if the heating means 6 are accommodated in housings 11 provided on the backs of the heating plates 1 in which housing the compensation plates 20 are also located. The housings 11 are exposed to a gas which forms the gas cushions 7. Thus, heat losses are for the most part prevented since gas can flow only through the holes 8 in the heating plates 1 into the space 2 in which the glass plate 3 is located.

When the heating means 6 are gas-fired, in the upper end walls 19 of the housing 11 there are exhaust gas openings 18.

In the preferred embodiment shown schematically by way of example in FIG. 2, the gas for the gas cushions 7 is supplied to the housings 11 so that it flows into the spaces 35 between the compensation plates 20 and the heating plates 1 in order to reach the holes 8 in the heating plates 1. Thus the gas is heated especially effectively.

Gas flowing out of the space 2 between the heating plates 1 can be routed in a circuit. For example, discharging gas is withdrawn via lines 25 which pass through the heating plates 1 at the top and is supplied again to the housings 11 by a fan 26 or the like via lines 27.

The housing 11 can be partially or completely insulated with a heat-insulating layer in the two embodiments, as is done in the embodiment shown in FIG. 2 for the side walls 29 by insulating layers 30.

Even if it is preferred within the framework of the invention that at least one heating plate 1 and/or at least one compensation plate 20 consists of ceramic material, the heating plate 1 or the compensation plate 20 can also consist of another heat-resistant material, for example, metal, especially steel. It is important for the compensation plate 20 that it releases heat uniformly (by radiation) to the heating plate 1 via its surface which faces the heating plate 1 so that the latter has a temperature as uniform as possible and uniformly radiates heat.

In summary, one embodiment of the invention can be described as follows:

A device for heating glass plates 3 for tempering or deformation has two heating plates 1 between which the glass plates 3 are located. Compensation plates 20 and next to them the heating means 6 are assigned with a distance to the heating plates 1. The heating means 6 are accommodated in the housings 11 which are bordered on one side by the heating plates 1. In the heating plates 1 there are holes 8 from which the gas flows out which is supplied to the housings 11 between the heating plates 1 and the compensation plates 20 and which is heated by flowing past the compensation plates 20, and on either side of the glass plate 3 forms the gas cushion 7 which supports it.

In this way the glass plate 3 is uniformly heated by radiation and convection.

I claim:

1. Device for heating of glass plates (3) with two heated plates (1), on the backs of the plates (1) facing away from the glass plate there being heating means (6), and between the plates (1) there can be the glass plate (3) to be heated, characterized in that the two plates (1) which are aligned parallel to one another and which are opposite one another border a space (2) between themselves for the glass plate (3) to be heated, that in the plates (1) there are holes (8) which can be supplied with a pressurized gas for purposes of forming a gas cushion (7) between the glass plate (3) to be heated and the plates (1), that the heating means (6) are located in housings (11) located on the backs of the plates (1) facing away from the glass plates (3) and that the housing (11) is supplied with gas (arrow 9) which emerges through the holes (8) in the plates (1);

wherein there are compensation plates (20) between the heating plates (1) and the heating means (6).

2. Device as claimed in claim 1, wherein the material of the plates (1) is a material with a high emission coefficient.

3. Device as claimed in claim 1, wherein the material comprising the heating plates (1) is a ceramic that is at least one of silicate-containing and aluminum oxide-containing.

4. Device as claimed in claim 1, wherein the compensation plates (20) consists of metallic and/or ceramic material.

5. Device as claimed in claim 1, wherein the material comprising the compensation plates (20) is an oxide ceramic, especially a silicate- and/or aluminum oxide-containing ceramic.

6. Device as claimed in claim 1, wherein the compensation plates (20) are accommodated in the housings (11) located on the back of the plates (1).

7. Device as claimed in claim 1, wherein the heating plates (1) are aligned at an acute angle to the vertical.

8. Device as claimed in claim 1, wherein a tilt of the heating plates (1) is variable.

9. Device as claimed in claim 1, wherein there is a transport and support device (4) for glass plates (3) on the lower edge of the heating plates (1).

10. Device as claimed in claim 1, wherein the gas which is supplied to the holes (8) in the plates (1) is supplied to the space (35) between the plates (1) and the compensation plates (20).

11. Device as claimed in claim 9, wherein the transport and support device (4) is located within the housing (11).

12. Device as claimed in claim 11, wherein the transport and support means (4) is accommodated in a chamber (13) on the bottom end of the housing (11).

13. Device as claimed in claim 12, wherein the drive (14) for the transport or support means (4) is located laterally next to one housing (11).

14. The device as claimed in claim 7, wherein the compensation plates (20) are aligned at an acute angle to the vertical.

15. The device as claimed in claim 8, wherein a tilt of the compensation plates (20) is variable.

16. Device for heating of glass plates (3) with two heated plates (1), on the backs of the plates (1) facing away from the glass plate there being heating means (6), and between the plates (1) there can be the glass plate (3) to be heated, characterized in that the plates (1) consist of oxide ceramic, that the two plates (1) which are aligned parallel to one another and which are opposite one another border a space (2) between themselves for the glass plate (3) to be heated, that in the plates (1) there are holes (8) which can be supplied with a pressurized gas for purposes of forming a gas cushion (7) between the glass plate (3) to be heated and the plates (1), that the heating means (6) are located in housings (11) located on the backs of the plates (1) facing away from the glass plates (3) and that the housing (11) is supplied with gas (arrow 9) which emerges through the holes (8) in the plates (1);
wherein there are two compensation plates (20) parallel to the plates (1) at a distance to the latter.

17. Device as claimed in claim 16, wherein at least one of the two heating plates (1) can be adjusted relative to other said heating plates (1).

18. Device as claimed in claim 16, wherein the heating means (6) is located at a distance from the heating plates (1).

19. Device as claimed in claim 16, wherein the space (2) between the heating plates (1) is closed in the area of the edges of the heating plates (1).

20. Device as claimed in claim 16, wherein there are seals of variable length on the edges of the heating plates (1) which run in the conveyor direction of the glass plates (3).

21. Device for heating of glass plates (3) with two heated plates (1), on the backs of the plates (1) facing away from the glass plate there being heating means (6), and between the plates (1) there can be the glass plate (3) to be heated, characterized in that the plates (1) consist of oxide ceramic, that the two plates (1) which are aligned parallel to one another and which are opposite one another border a space (2) between themselves for the glass plate (3) to be heated, that in the plates (1) there are holes (8) which can be supplied with a pressurized gas for purposes of forming a gas cushion (7) between the glass plate (3) to be heated and the plates (1), that the heating means (6) are located in housings (11) located on the backs of the plates (1) facing away from the glass plates (3) and that the housing (11) is supplied with gas (arrow 9) which emerges through the holes (8) in the plates (1);
wherein there are further provided a means for conveying the glass plates between the plates (1), and adjustable seals on side edges of the plates (1) which run transversely to a conveyor direction of the means for conveying.

22. Device as claimed in claim 21, wherein the gas for forming the gas cushions (7) is fed into the housing (11) by lines (17) which discharge on the side of the heating means (6) which is turned away from the plates (1).

23. Device as claimed in claim 21, wherein gas is exhausted from the space (2) between the plates (1) and supplied again to the housings (11).

24. Device as claimed in claim 23, wherein there is at least one fan (26) which is connected on the intake side (line 25) to the space (2) between the plates (1) and on the pressure side (line 27) to the space (35) between the plates (1) and compensation plates (20) disposed behind the plates (1).

25. Device as claimed in claim 24, wherein from the top end of the space (2) between the plates (1) at least one line (15) proceeds which leads to the intake side of a fan (16) which is connected on the pressure side to the lines (17) for supplying gas to the housing (11).

26. A device for heating glass plates comprising:
two heated plates arranged parallel to one another so as to border a space therebetween suitable for placement of a glass plate;
heaters arranged so as to heat the two heated plates;
holes arranged in the heated plates so as to allow forming a gas cushion between the glass plate and the heated plates;
a housing connected to each of the heated plates;
a gas supply connected to the housing; and
compensation plates arranged between the heated plates and the heaters;
wherein the device is arranged so that gas provided by the gas supply passes through the holes in the heated plates so as to form the gas cushion.

27. A device for heating glass plates comprising:
two heated plates arranged parallel to one another so as to border a space therebetween suitable for placement of a glass plate;
heaters arranged so as to heat the two heated plates;
holes arranged in the heated plates so as to allow forming a gas cushion between the glass plate and the heated plates;
a housing connected to each of the heated plates;
a gas supply connected to the housing; and
compensation plates arranged parallel to the heated plates;
wherein the device is arranged so that gas provided by the gas supply passes through the holes in the heated plates so as to form the gas cushion.

28. A device for heating glass plates comprising:
two heated plates arranged parallel to one another so as to border a space therebetween suitable for placement of a glass plate;
heaters arranged so as to heat the two heated plates;
holes arranged in the heated plates so as to allow forming a gas cushion between the glass plate and the heated plates;
a housing connected to each of the heated plates;
a gas supply connected to the housing; and means for conveying said glass plate between the heated plates;

adjustable seals disposed on side edges of the heated plates that run transverse to a direction of travel of the means for conveying;

wherein the device is arranged so that gas provided by the gas supply passes through the holes in the heated plates so as to form the gas cushion.

* * * * *